United States Patent [19]
Browning

[11] 3,858,673
[45] Jan. 7, 1975

[54] VEHICLE HAVING SPHERICAL SUPPORTS

[76] Inventor: Albert E. Browning, Route 4, Box 425, Winnsboro, La. 71295

[22] Filed: Oct. 1, 1973

[21] Appl. No.: 402,072

[52] U.S. Cl. ............... 180/26 R, 180/74, 280/28.5
[51] Int. Cl. .................... B62d 57/00, B62d 61/06
[58] Field of Search ............ 180/26 R, 21, 74, 7 R; 280/11.1 BR, 28.5, DIG. 7; 305/34; 301/5 R; 152/9

[56] References Cited
UNITED STATES PATENTS

| | | | |
|---|---|---|---|
| 1,928,412 | 9/1933 | Deninson | 180/21 |
| 2,990,026 | 6/1961 | Albee | 180/74 |
| 3,655,005 | 4/1972 | Chicurel | 180/26 R |

FOREIGN PATENTS OR APPLICATIONS

| | | | |
|---|---|---|---|
| 199,208 | 8/1938 | Switzerland | 280/11.1 BR |
| 1,005,998 | 4/1952 | France | |

*Primary Examiner*—David Schonberg
*Assistant Examiner*—Terrance L. Siemens
*Attorney, Agent, or Firm*—Jennings, Carter & Thompson

[57] ABSTRACT

A plurality of spherical supports are held in place on a vehicle frame by a pair of lower rollers which engage opposite sides of each spherical support below the center thereof and a pair of upper spaced apart rollers which engage each spherical support above the center thereof. The upper and lower rollers are carried by the vehicle frame and are adapted for rotation about horizontal axis parallel to each other. Lateral movement of each spherical support is limited by laterally disposed rollers on the frame. One spherical support member and its associated rollers are carried by a rotatable frame which is movable to selected positions to steer the vehicle.

4 Claims, 5 Drawing Figures

3,858,673

VEHICLE HAVING SPHERICAL SUPPORTS

BACKGROUND OF THE INVENTION

This invention relates to a vehicle and more particularly to a vehicle which is supported by a plurality of spherical supports with one spherical support being carried by a rotatable frame which is movable to selected positions to steer the vehicle.

Heretofore in the art to which my invention relates, spherical supports have been employed for supporting articles of furniture and the like. However, so far as I am aware, no one has devised means for supporting a vehicle on spherical members whereby the vehicle is capable of being driven and steered.

BRIEF SUMMARY OF THE INVENTION

In accordance with my present invention, I provide a vehicle frame which carries a pair of lower rollers in position to engage opposite sides of a spherical support below the center thereof and a pair of upper, spaced apart rollers which engage each spherical support above the center thereof. The upper and lower rollers are adapted for rotation about horizontal axes parallel to each other. Laterally disposed rollers are mounted on the frame in position to engage the sides of the spherical supports to limit lateral movement thereof. One of the spherical supports, together with its associated rollers, is carried by a rotatable frame which is movable to selected angular positions relative to the vehicle frame whereby the vehicle is steered. Rotary motion is imparted to the spherical member carried by the rotatable frame by one of its upper rollers which in turn is operatively connected to a power unit.

DESCRIPTION OF THE DRAWINGS

Apparatus embodying features of my invention is illustrated in the accompanying drawings, forming a part of this application, in which.

Figure 1:
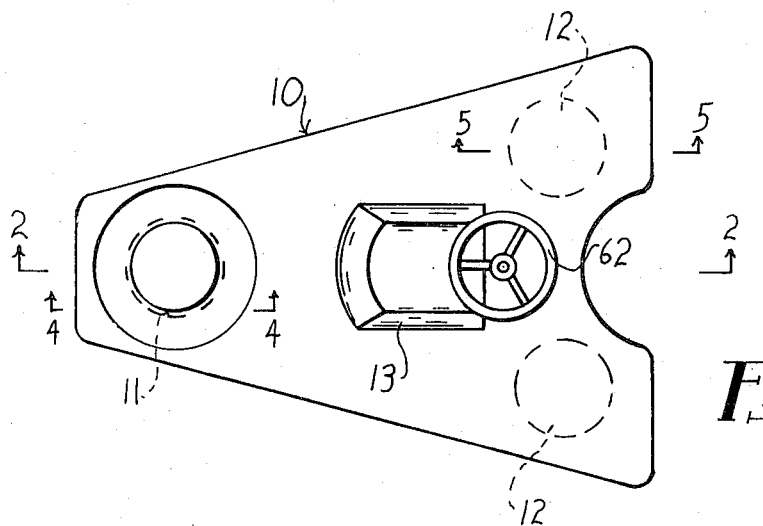
FIG. 1 is a top plan view showing my improved vehicle.

Referring now to the drawings for a better understanding of my invention, I show a vehicle frame 10 which is supported adjacent the rear end thereof by a spherical support member 11 and is supported adjacent the forward end thereof by laterally disposed spherical support members 12. The vehicle frame 10 may carry a suitable seat 13 for the operator.

The rear spherical support member 11 is retained in place by a pair of lower rollers 14 and 16 and upper, spaced apart rollers 17 and 18. The rollers 14, 16 and 18 are supported from a depending, auxiliary frame 19 by transverse, shaft-like members 21, 22 and 23, respectively, which may be in the form of bolt-like members with each having a suitable retaining nut 24. The depending auxiliary frame 19 is shown as comprising a pair of depending supports 26 at the forward side of the spherical support member 11 and a pair of depending supports 27 at the rear side of the support member 11. The lower ends of each of the supports 26 and 27 are connected to or formed integrally with the lower ends of arcuate support members 28, as clearly shown in FIGS. 3 and 4. The upper ends of supports 26 and 27 are secured rigidly to and form a part of a rotatable frame indicated generally at 29.

Figure 2:
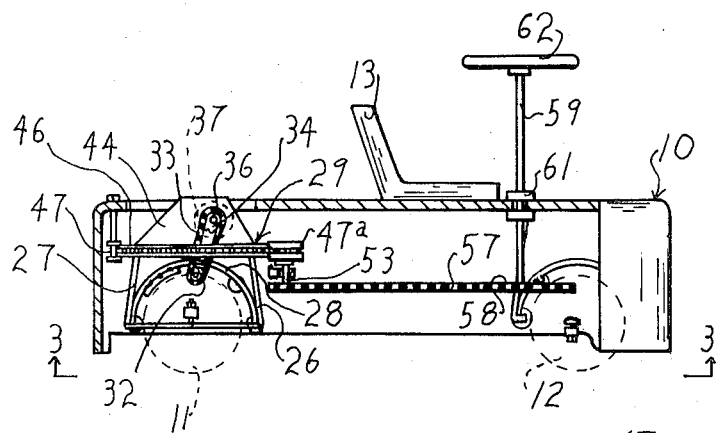
FIG. 2 is a sectional view taken generally along the line 2—2 of FIG. 1, the spherical support members being shown in dotted lines for the sake of clarity.
Figure 3:
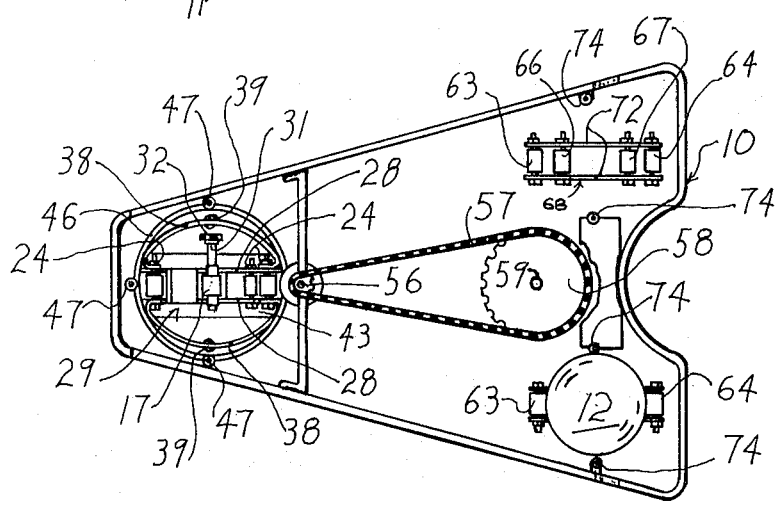
FIG. 3 is a bottom plan view taken generally along the line 3—3 of FIG. 2, the rear spherical support member and one of the forward spherical support members being omitted for the sake of clarity.
Figure 4:
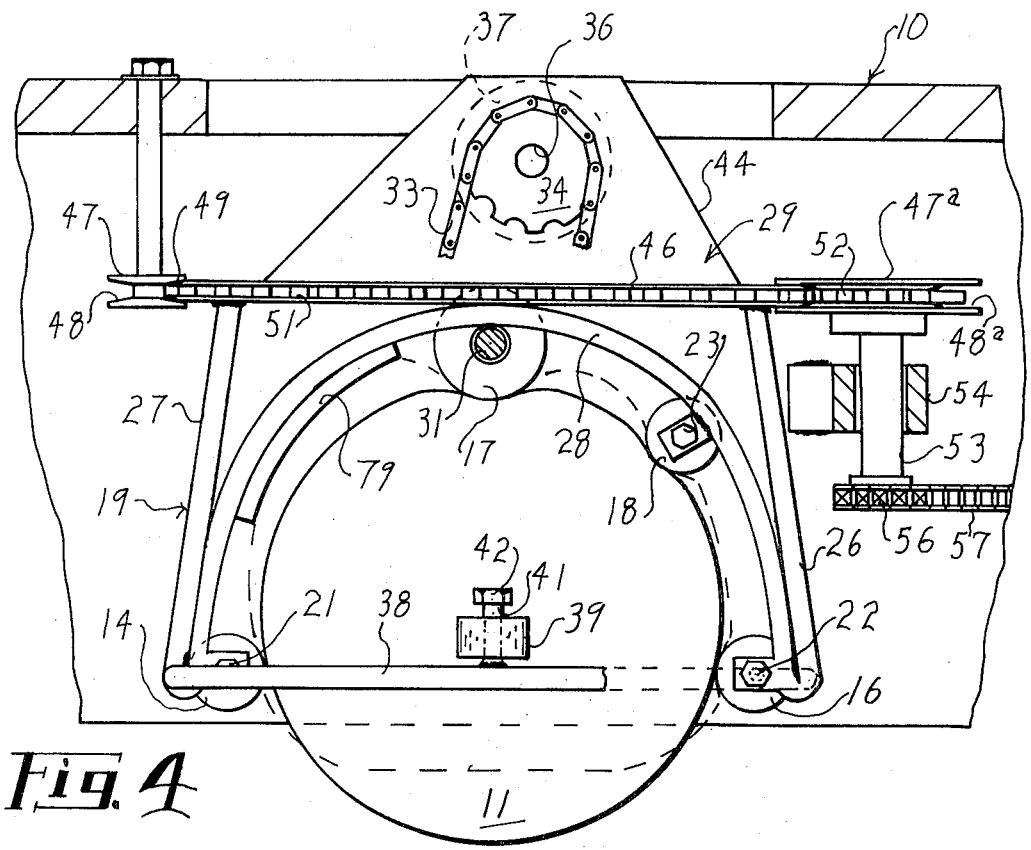
FIG. 4 is an enlarged, fragmental, sectional view taken generally along the line 4—4 of FIG. 1; and, FIG. 5 is an enlarged, detailed, sectional view taken generally along the line 5—5 of FIG. 1, the spherical member being shown in dotted lines.

As shown in FIGS. 2–4, the upper roller 17 is mounted nonrotatably on a drive shaft 31 which carries a sprocket 32. A sprocket chain 33 passes around the sprocket 32 and a drive sprocket 34 mounted on a shaft 36 of a power unit 37 which may be in the form of an electric motor or an internal combustion engine. Accordingly, rotary motion is imparted from the motor 37 to the drive roller 17 which engages the upper surface of the spherical support member 11, as shown.

The lower ends of the supports 26, 27 and 28 are connected to horizontally extending, arcuate supports 38 which in turn carry laterally disposed rollers 39 mounted on upstanding shafts 41. The lower ends of the shafts 41 are welded to the arcuate supports 38 and a suitable retaining element 42 limits upward movement of each roller 39 whereby the rollers 39 are in position to engage the sides of the spherical support member 11 and thus limit lateral movement thereof relative to the rotatable frame 29.

As shown in FIGS. 2, 3 and 4, the rotatable frame 29 comprises a horizontal central portion 43 which is connected to an upstanding plate-like member 44 which in turn supports the power unit 37. The rotatable frame 29 is provided with a peripheral edge 46 which is supported by angularly spaced rotatable members 47 having horizontally disposed annular grooves 48 therein for receiving the annular peripheral edge 46. Preferably, the peripheral edge 46 is beveled as at 49 whereby it corresponds to the beveled inner surface of the rotatable member 47 forming the groove 48. One of the rotatable members indicated at 47a is provided with an annular, horizontal groove 48a for receiving the peripheral edge 46.

As shown in FIG. 4, the peripheral edge 46 of the frame 29 is provided with a plurality of angularly spaced recesses 51 in position to receive radially projecting teeth 52 carried by the rotatable member 47a which are positioned within the annular groove 48a. Accordingly, upon rotation of the rotatable member 47a, rotary motion is imparted to the peripheral annular edge 46 whereupon rotary motion is imparted to the rotary frame 29.

The rotatable member 47a is mounted on a vertical shaft 53 which is mounted for rotation in a suitable bearing 54 carried by the vehicle frame 10. The lower end of the shaft 53 carries a sprocket 56 which receives a sprocket chain 57 which also passes around a larger sprocket 58, as shown in FIG. 3. The sprocket 58 extends in a horizontal plane and is mounted at the lower end of a vertical shaft 59 which extends through and is mounted for rotation in a suitable bearing 61 mounted on the frame 10, as shown in FIG. 2. The upper end of the shaft 59 carries a steering wheel 62 whereby the shaft 59 may be rotated in opposite directions to in turn impart rotary motion to the frame 29 in opposite directions to steer the vehicle 10.

Figure 5:
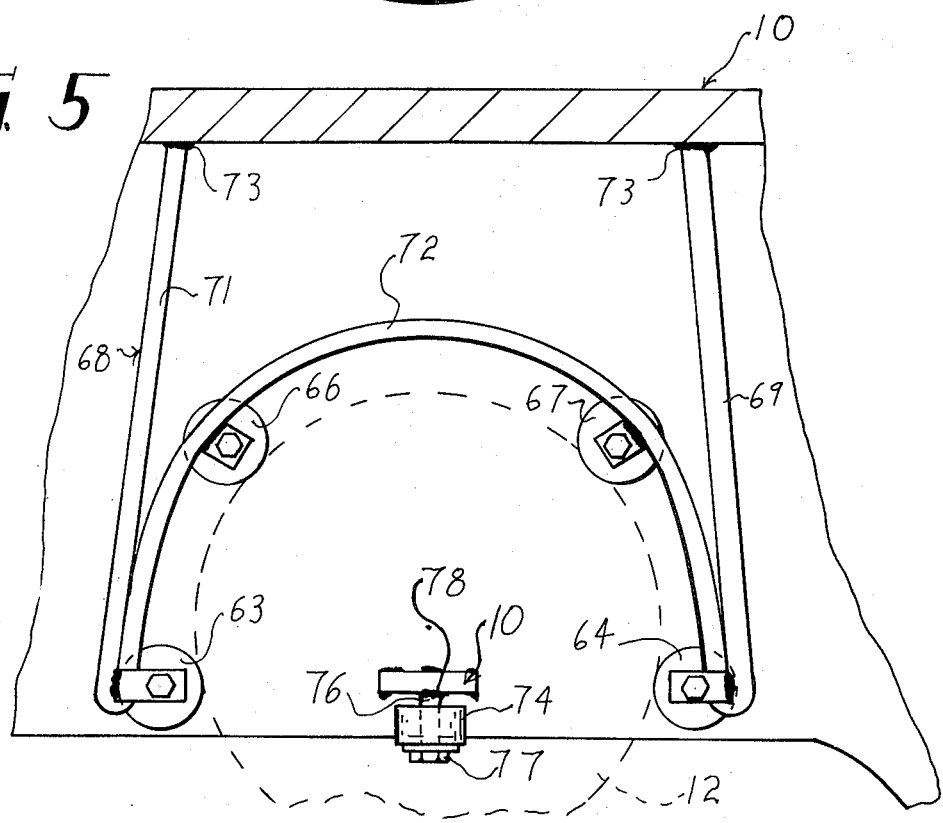

As shown in FIGS. 3 and 5, the forward spherical support members 12 are supported by lower rollers 63 and 64 which engage opposite sides of each spherical support member 12 below the center thereof and upper, spaced apart rollers 66 and 67 which engage each spherical support member 12 above the center thereof. The rollers 63, 64, 66 and 67 are adapted for rotation about horizontal axes parallel to each other whereby the spherical support member is adapted for rotation within the confines of the lower and upper rollers.

The rollers 63, 64, 66 and 67 are supported by an auxiliary frame 68 having depending supports 69 at the forward side of each spherical support member 12 and depending supports 71 at the rear side of each spherical support member 12. The lower ends of the supports 69 and 71 are connected to opposite ends of an arcuate support member 72 which extends around the upper portion of the spherical member 12, as shown. The lower ends of the arcuate supports 72 may be formed integrally with the lower ends of the supports 69 and 71 or may be secured by welding. The upper ends of the vertical supports 69 and 71 are secured to the under surface of the vehicle frame 10 by suitable means, such as by welding at 73.

As shown in FIGS. 3 and 5, rollers 74 are carried by the supporting frame 10 in position to engage the sides of the spherical support members 12 to limit lateral movement thereof. Each roller 74 is mounted on a vertical shaft-like member 76 having a retaining member 77 at one end thereof with the other end being secured to the frame 10 by welding as at 78.

As shown in FIGS. 2 and 4, the arcuate support member 28 which extends around the upper portion of the spherical support member 11 carries an arcuate brake pad 79 between the drive roller 17 and the rearmost lower roller 14 in position to engage the outer surface of the spherical support member 11 upon movement thereof from the solid line position to the dotted line position shown in FIG. 4. That is upon cessation of rotation of the drive roller 17, the weight and momentum of the vehicle 10 causes the spherical support member 11 to be distorted whereby it moves from the solid line position to the dotted line position shown in FIG. 4 to thus restrain rotation of the spherical support member 11.

From the foregoing, the operation of my improved vehicle will be readily understood. The power unit 37 imparts a rotary motion to the spherical support member 11 through the drive arrangement and roller 17. Since the rotatable frame 29 is adapted for rotation 360+, the direction of movement of the vehicle may be changed abruptly, if desired, by merely rotating the steering wheel 62 a sufficient angular distance to position the spherical support member at an angular position relative to the direction of travel. Upon rotating the frame 29, any angular movement up to approximately 80° gives a moderate turning effect. However, upon approaching approximately 90°, the spherical support member 11 turns rapidly to produce a spinning effect. Accordingly, my improved vehicle is particularly adapted for use as an amusement device where quick or erratic turns are desired. To stop forward movement of the vehicle, the power is cut off to the drive roller 17 whereupon the momentum of the frame 10 causes the spherical member 11 to be distorted to the dotted line position shown in FIG. 4. That is, the outer surfaces of the spherical support members 11 are formed of a resilient material and are preferably hollow whereby they may be inflated with air.

From the foregoing, it will be seen that I have devised an improved vehicle and steering means therefor. By providing means for rotating one of the spherical support members in a vertical plane about a horizontal axes and providing steering means for rotating the spherical support member in a horizontal plane about a vertical axis, the direction of movement of the vehicle may be readily changed. Also, by providing a brake pad in position to engage the drive roller upon cessation of rotation of the drive roller, the vehicle may be stopped quickly. Furthermore, it will be seen that I have devised a vehicle which is extremely simple of construction, economical of manufacture and one which is particularly adapted for use as an amusement device.

While I have shown my invention in but one form, it will be obvious that it is not so limited, but is susceptible of various other changes and modifications without departing from the spirit thereof.

What I claim is:

1. A vehicle comprising:
   a. a supporting frame,
   b. a plurality of spherical support members for said frame,
   c. a pair of lower rollers carried by said frame for each said spherical support member engaging opposite sides of said spherical support member below the center thereof and adapted for rotation about horizontal axes parallel to each other,
   d. upper, spaced apart rollers carried by said frame and engaging each said spherical support member above the center thereof and adapted for rotation about horizontal axes parallel to each other and parallel to the axes of rotation of said lower rollers so that each said spherical support member is adapted for rotation within the confines of said lower rollers and said upper rollers about an axis parallel to the axes of rotation of said lower rollers and said upper rollers,
   e. laterally disposed rollers carried by said frame in position to engage the sides of each said spherical support member to limit lateral movement thereof,
   f. one of said spherical support members being driven by at least one of said upper rollers which is operatively connected to a power unit,
   g. said upper and lower rollers and said laterally disposed rollers for said one spherical support member being carried by a rotatable frame mounted for horizontal rotation in said supporting frame about a vertical axis with said drive roller being the rearmost one of said upper rollers, as viewed in the direction of travel of the vehicle, and
   h. a brake pad carried by said rotatable frame in position to engage said one spherical member upon sudden cessation of rotation of said drive roller.

2. A vehicle as defined in claim 1 in which said rotatable frame comprises,
   a. a horizontal member having an annular peripheral edge,
   b. angularly spaced rotatable members carried by said supporting frame and having horizontally disposed annular grooves therein for receiving said annular peripheral edge, and
   c. means driving one of said rotatable members selectively in opposite directions to impart rotation to said rotatable frame selectively in opposite directions whereby said vehicle is steered.

3. A vehicle as defined in claim 2 in which said means driving one of said rotatable members in opposite directions comprises:
   a. a drive shaft for said one of said rotatable members,
   b. steering means carried by said supporting frame in reach of an operator thereof, and
   c. means operatively connecting said steering means to said drive shaft so that actuation of said steering means rotates said drive shaft.

4. A vehicle as defined in claim 3 in which the means operatively connecting said steering means to said drive shaft comprises:
   a. a first rotatable element operatively connected to said steering means,
   b. a second rotatable element carried by said drive shaft and a flexible drive member connecting said first and second rotatable elements in driving relation with each other.

* * * * *